United States Patent
Kaushik

(10) Patent No.: US 9,456,389 B2
(45) Date of Patent: Sep. 27, 2016

(54) DYNAMIC GENERATION OF PER-STATION REALM LISTS FOR HOT SPOT CONNECTIONS

(71) Applicant: Meru Networks, Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 47 days.

(21) Appl. No.: 14/514,359

(22) Filed: Oct. 14, 2014

(65) Prior Publication Data

US 2016/0105824 A1   Apr. 14, 2016

(51) Int. Cl.
  *G01R 31/08* (2006.01)
  *H04W 36/00* (2009.01)
  *H04W 48/16* (2009.01)
  *H04W 36/18* (2009.01)

(52) U.S. Cl.
  CPC ......... *H04W 36/0016* (2013.01); *H04W 36/18* (2013.01); *H04W 48/16* (2013.01)

(58) Field of Classification Search
  CPC   H04W 36/0016; H04W 48/16; H04W 36/18
  See application file for complete search history.

(56) References Cited

U.S. PATENT DOCUMENTS

| 9,088,894 | B1 * | 7/2015 | Kaushik | H04W 12/06 |
| 9,253,717 | B2 * | 2/2016 | Kim | H04W 48/18 |
| 2013/0121325 | A1 * | 5/2013 | McCann | H04W 48/12 370/338 |
| 2014/0171078 | A1 * | 6/2014 | Ryerson | H04W 48/18 455/435.2 |
| 2014/0185597 | A1 * | 7/2014 | Gupta | H04L 63/0823 370/338 |
| 2014/0199968 | A1 * | 7/2014 | Canpolat | H04W 48/20 455/411 |
| 2014/0204903 | A1 * | 7/2014 | Kim | H04W 48/18 370/331 |
| 2014/0235167 | A1 * | 8/2014 | Jung | H04W 48/16 455/41.2 |
| 2015/0029879 | A1 * | 1/2015 | Chou | H04W 76/02 370/252 |
| 2015/0071141 | A1 * | 3/2015 | Vallabhu | H04W 52/0229 370/311 |

* cited by examiner

*Primary Examiner* — Robert Wilson
(74) *Attorney, Agent, or Firm* — Law Office of Dorian Cartwright

(57) ABSTRACT

Per-station realm lists are dynamically generating per-station for hot spot connections to access points by roaming stations. A query for a list of realms is received from a roaming station when connecting to a hot spot. Using an MAC address or other station identity, a list of available realms narrowed to a subset of per-station realms sent to the station. Narrowing is performed on-the-fly with respect to at least one aspects. A last N realms are retrieved from a database record searched by MAC address. The list is further narrowed by removing realms that are inaccessible or otherwise recently shown to have bad link quality. Additional ranking factors can narrow or rearrange the realm list based on financial agreements, popularity, trends, and the like. A selection from the list of realms is received from the station. The access point then authenticates the station with the selected realm. If successful, data traffic concerning the station can be forwarded through the hot spot on behalf of the selected realm.

18 Claims, 7 Drawing Sheets

400

| | Element ID | Length | Access Network Options | Venue Info (Optional) | HESSID (optional) |
|---|---|---|---|---|---|
| Octets | 1 | 1 | 1 | 0 or 2 | 0 or 6 |

| | Element ID | Length | Number of ANQP OIs | OI #1 and #2 Lengths | OI #1 | OI #2 | OI #3 |
|---|---|---|---|---|---|---|---|
| Octets | 1 | 1 | 1 | 1 | variable | variable | variable |

| | Element ID | Length | Advertisement Protocol Tuple #1 | Advertisement Protocol Tuple #2 (optional) | ... | Advertisement Protocol Tuple #n (optional) |
|---|---|---|---|---|---|---|
| Octets | 1 | 1 | variable | variable | | variable |

FIG. 4C

DYNAMIC GENERATION OF PER-STATION REALM LISTS FOR HOT SPOT CONNECTIONS

FIELD OF THE INVENTION

The invention relates generally to wireless computer networking, and more specifically, to dynamically generating a list of per-station realms for hot spot WLAN (Wireless Local Area Network) connections.

BACKGROUND

Hot spots are becoming more ubiquitous as the number of mobile devices increases, and further, as cellular networks seek to offload data traffic. Generally, a hot spot provides a WLAN connection for a mobile device within range for data roaming. A user that travels among hot spots can connect to many different hot spots that each require configuration.

Recent technologies such as IEEE 802.11u (promulgated by the Institute of Electrical and Electronics Engineers) and Hot Spot 2.0 (also known as HS2 and Wi-Fi Certified Passpoint and promulgated by the Wi-Fi Alliance) make hot spot roaming easier by advertising more than just basic information to stations in the network discovery process. For example, IEEE 802.11u provides for beacons that advertise realms available for connection from a hot spot, allowing a station to determine compatibility to the realms.

However, while there are numerous available realms for which a hot spot may be able to offer service from, IEEE 802.11u only provides for three. One the one hand, by providing only three realms, beacon-processing is eased. But on the other hand, there is currently no technique for discriminating between available realms when stations request more information for available realms. As a result, numerous irrelevant realms could burden stations.

What is needed is a robust technique to dynamically generate a per-station real list for hot spot connections from a list of available realms.

SUMMARY

These shortcomings are addressed by the present disclosure of methods, computer program products, and systems for dynamically generating per-station real lists for hot spot connections.

In one embodiment, a query for a list of realms is received from a roaming station when connecting to a hot spot. Using an MAC (Medium Access Control) address or other station identity, a list of available realms narrowed to a subset of per-station realms sent to the station. Narrowing can be performed on-the-fly. In one instance, a last N realms are retrieved from a database record searched by MAC address. In another instance, the list is further narrowed by removing realms that are inaccessible or otherwise recently shown to have bad link quality. In yet another instance, additional ranking factors can narrow or rearrange the realm list based on financial agreements, popularity, trends, and the like.

In another embodiment, a selection from the list of realms is received from the station. The access point then authenticates the station with the selected realm. If successful, data traffic concerning the station can be forwarded through the hot spot on behalf of the selected realm.

Advantageously, improved realm selection is available for stations roaming hot spots, for situations such as data offloading from cellular networks to Wi-Fi.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4A-C are block diagrams illustrating elements of access point beacons and station queries, according to some embodiments.

DETAILED DESCRIPTION

The present invention provides methods, computer program products, and systems for dynamically generating per-station real lists for hot spot connections. A hot spot operated by a device (e.g., an access point or a smart phone) provides a WLAN connection for a mobile device within range for data roaming. Generally, the term realms is used generically herein to refer to NAI (Network Access Identifier) realms, OIs (Organization Identifier), OUIs (Organizationally Unique Identifier), ISPs (Internet Service Providers), SSP (Subscription Service Providers), and other network service providers configured to provide roaming data services through not spots. The techniques ease hot spot connections for roaming stations and others. For example, a smartphone can automatically roam to a hot spot for offloading data from a cellular network. Although the hot spot allows the connection without a fee to the user, based on the amount of data usage, the hot spot can charge the cellular network for the offloading. Although the description refers to Wi-Fi, other types of wireless communication networks, such as Bluetooth, can be substituted. One of ordinary skill in the art will recognize that many other scenarios are possible, as discussed in more detail below.

Systems to Dynamically Generate Per-Station Realm Lists for Hot Spot Connections (FIGS. 1-4)

Figure 1:
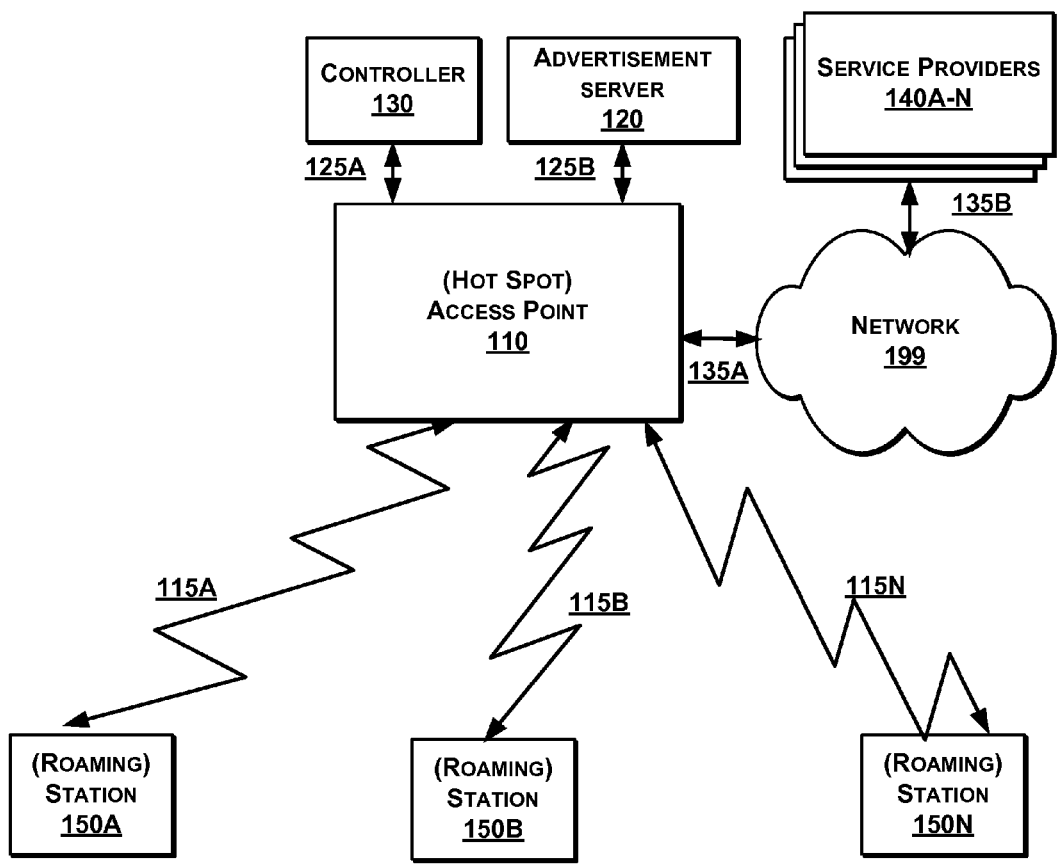
FIG. 1 is a high-level block diagram illustrating a system to dynamically generate per-station realm lists for hot spot connections, according to one embodiment.

FIG. 1 is a high-level block diagram illustrating a system 100 to dynamically generate per-station realm lists for hot spot connections, according to one embodiment. The system 100 comprises a (hot spot) access point 110, an advertisement server 120, a controller 130, service providers 140A-N, and (roaming) stations 150A-N. The components can be coupled to a network 199, such as the Internet, a local network or a cellular network, through any suitable wired (e.g., Ethernet) or wireless (e.g., Wi-Fi or 4G) medium, or hybrid combination of network types. In a preferred embodiment, the access point 110 is coupled to the stations 150A-N through wireless communication channels 115A-N. Additionally, the access point 110 is coupled to back-end components such as the advertisement server 120, the controller 130, or the like, through wired communication channels 125A, 125B, and coupled to and to the network 199 and external resources, such as the service providers 135A-N and web site hosts, through wired communication channels 135A, 135B. Other devices, such as smart phones and lap top, can also operate hot spots.

Other embodiments of communication channels for system 100 are possible. Additional network components can also be part of the system 100, such as additional controllers (e.g., an SDN, or software-defined networking, controller), additional access points, firewalls, virus scanners, routers, switches, application servers, databases, and the like. Numerous hot spots can overlap in coverage areas, operating jointly or autonomously. Moreover, an enterprise can also operate hot spots at different locations under centralized information servers.

The access point 110 dynamically narrows down a list of available realms to a list of preferred realms sent to the stations 150A-N. The list of available realms can be pre-configured (e.g., manually) in the access point 110, automatically discovered, or provided by an external source (e.g., the controller 130). Various factors can dictate narrowing algorithms, including previous connection histories (e.g., database record) of the stations 150A-N, specific agreements between service providers and entities associated with the hot spot (e.g., Starbucks and Verizon), and link quality (e.g., accessibility) to the service providers 140A-N. The number of factors, relative weighting, and other algorithm details are implementation-specific. While a newly connecting station receives a list closer to static realm lists of the prior art, in an embodiment, returning stations with more history can receive a more customized list. Returning stations are identifiable by MAC addresses stored in a searchable database. Neighboring access points, external resources, or other components other than the access point 110 can also update database records (e.g., responsive to a connection with a neighboring access point).

The connection process for the access point 110 begins with broadcasted beacons that include an NAI realm list that identifies all realms available through the BSS (Basic Service Set). According to the techniques described herein, the top three preferred realms are provided in a format compliant with, for example, IEEE 802.11u. Additionally, realms for roaming consortiums can be identified by an OI (organization identifier) which is a 24-bit strings assigned by IEEE. Other realms can be identified by an OIU which is a globally-unique 36-bit string, identifying a manufacturer, operator, or other organization. In some embodiments, additional realms can be provided upon request from stations 150A-N. At this point, the access point 110 is able to identify the station and provide customized aspects of dynamically generated realm lists. The resulting list can be the same as the beacon or modified. In some cases, the requests to the access point 110 for additional realms can be offloaded to the advertisement server 120 to prevent disruption of access point services. The access point 110 broadcasts beacons advertising one or more BSSIDs (Basic Service Set Identifiers) in accordance with IEEE 802.11 or other protocols to allow connections by the stations 150A-N that are able to authenticate with the preferred realms of the access point 110. In one example, a BSSID is a 48-bit field of the same format as an IEEE 802 MAC address that uniquely identifies a BSS (Blind Service Set). The access point 110 can authenticate a selected realm of the preferred realms suing IEEE 802.1x or other authentication paradigms. Once the stations 150A-N establish a connection by associating and authenticating, data services to the network 199 are made available by the access point 110 on behalf of one or the service providers 140A-N.

In another embodiment, a NAI home realm query can be received from the stations 150A-N that are actively discovering supported realms. The NAI home realm query includes NAI realms for which it has authentication credentials. More generally, an NAI is a standard under RFC 4282 for identifying users requesting access to the network. The NAI realm identifies the proper authentication server or domain for the user's authentication exchange. Optionally, the NAI realm can also indicate the EAP (Extensible Authentication Protocol) types supported by each realm as well as authentication parameters for that EAP type. Once connected, the access point 110 uses IEEE 802.1x to authenticate the station with a realm and begins forwarding packets concerning the stations 110A-N. In some cases, the service providers 140 are charged based on an amount of network usage by associated stations.

Figure 7:
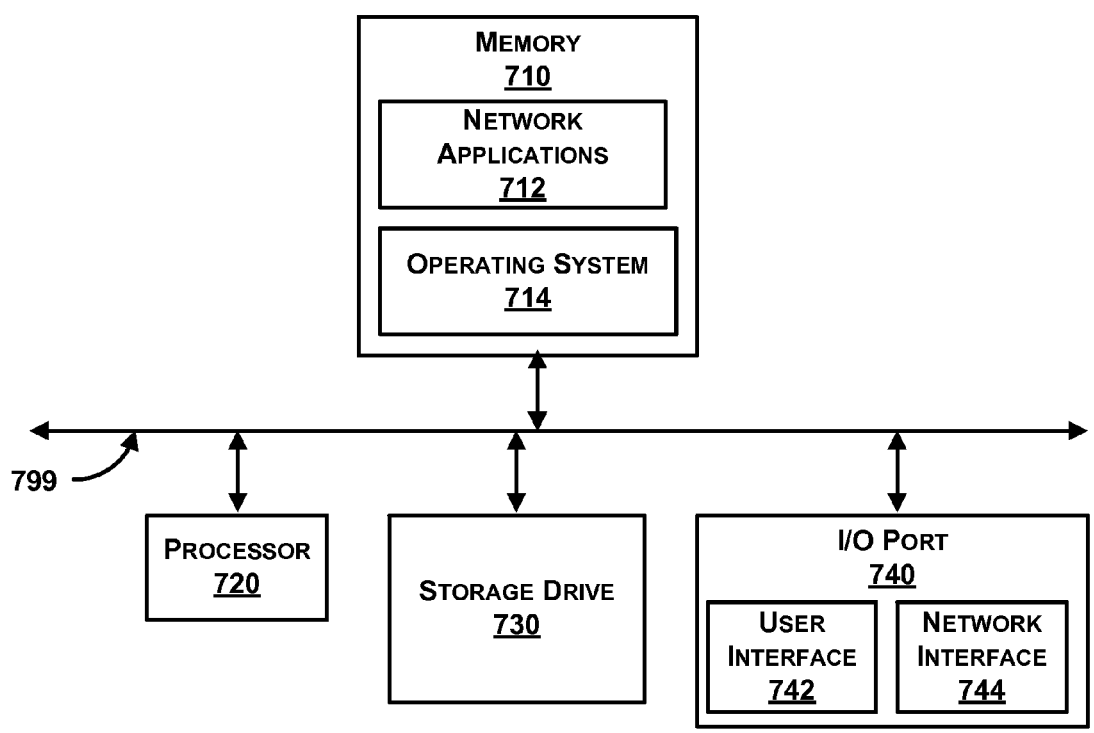
FIG. 7 is a block diagram illustrating an exemplary computing device, according to one embodiment.

The access point 110 can be implemented as a server blade, a PC, a laptop, a smartphone with tethering services, any appropriate processor-driven device, or any of the computing devices discussed herein (e.g., see FIG. 7). The access point 110 can be specifically configured for hot spot roaming or be generically configured. For example, the access point 110 can be an AP 110 or AP 433 (modified as discussed herein) by Meru Networks of Sunnyvale, Calif. A network administrator can strategically place multiple access points for optimal coverage area over a locale. The access point 110 can, in turn, be connected to a wired hub, switch or router connected to the network 199. In another embodiment, the functionality is incorporated into a switch or router. In some embodiments, a controller (not shown) provides management and offloading services to a group of access points over a LAN in a single locale or through cloud-services for geographically distributed or independent access points. More detailed embodiments of the access point 110 are discussed below in association with FIG. 2.

The stations 150A-N detect various hot spots as a user moves to different locations. At this point, the stations 150A-N are in a network discovery mode because the stations 150A-N are unauthenticated and unassociated with respect to the access point 110. Beacons from the access point 110 and potentially other available access points are detected, along with available realms in one case. Also, a request is sent to available access points to receive available realms in another case. More specifically, a Public Action frame provided by IEEE 802.11u enables the stations 150A-N to prompt the access point 110 for more information before an association for obtaining an IP address is formed. For example, GAS (Generic Advertisement Service) frames with ANQP (Access Network Query Protocol) requests can be utilized the stations 150A-N to discover supported realms beyond the three advertised (see e.g., FIGS. 4B an 4C). Once a list of preferred realms is sent to the stations 150A-N from the access point 110, a realm can be automatically selected or manually input by a user. Authentication credentials provided by IEEE 802.1x or some other mechanism are forwarded from the stations 150A-N to the access point 110 to begin normal Wi-Fi use.

The stations 150A-N can be implemented as a personal computer, a laptop computer, a tablet computer, a smart phone, a mobile computing device, a server, a cloud-based device, a virtual device, an Internet appliance, or any of the computing devices described herein (see e.g., FIG. 7). The stations 150A-N can be specifically configured for hot spot roaming (e.g., with authentication credentials or with a mobile application) or be generically configured (e.g., with operating system integration). No special client is needed for techniques described herein, although other aspects of the network may require downloads to the stations 150A-N. The stations 150A-N connect to the access point 110 for access to a LAN or external networks using an RF (radio frequency) antenna and network software complying with, for example, IEEE 802.11.

Figure 2:
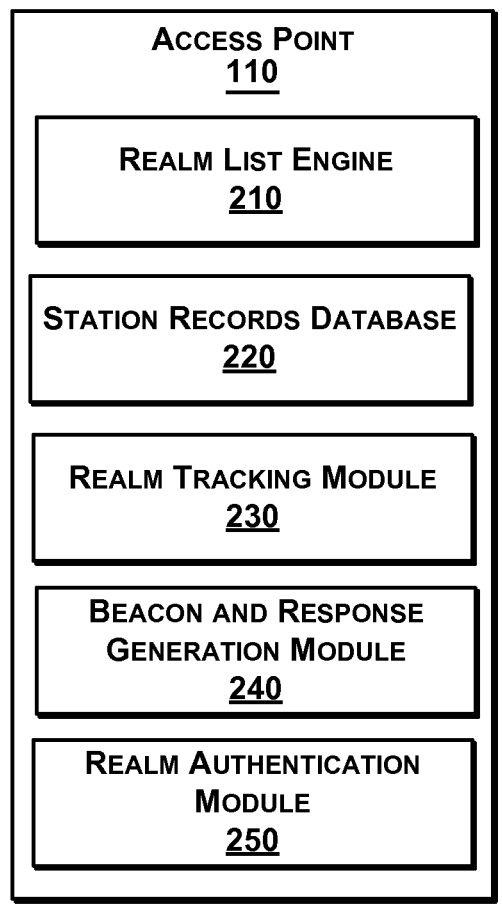
FIG. 2 is a more detailed block diagram illustrating an access point of the system of FIG. 1, according to one embodiment.

FIG. 2 is a more detailed block diagram illustrating an access point 110 of the system 100, according to one embodiment. The access point 110 comprises a realm list engine 210, a station records database 220, a realm tracking module 230, a beacon and response generation module 240, and a realm authentication module 250. The components can be implemented in hardware, software, or a combination of both.

The realm list engine 210 generates a list of preferred realms from a list of available realms, at least partially on-the-fly. To do so, the station records data base 220 is called to search database records for MAC addresses of stations requesting realm lists. The database can be stored locally or be shared database stored remotely. The realm list engine 210 can also call a realm tracking module 230 to check for inaccessible realms that should be removed from the list. Exceptions for a particular realm can be monitored to identify problems. Realms can be just temporarily removed until later connections show more reliability. Finally, the beacon and response generation module 240 can embed the list of realms in beacons or probe responses transmitted by access points. Also, one or more BSSIDs are included in beacons or probe responses. The realm authentication module 250 handles authentication of stations with selected realms.

Figure 3:
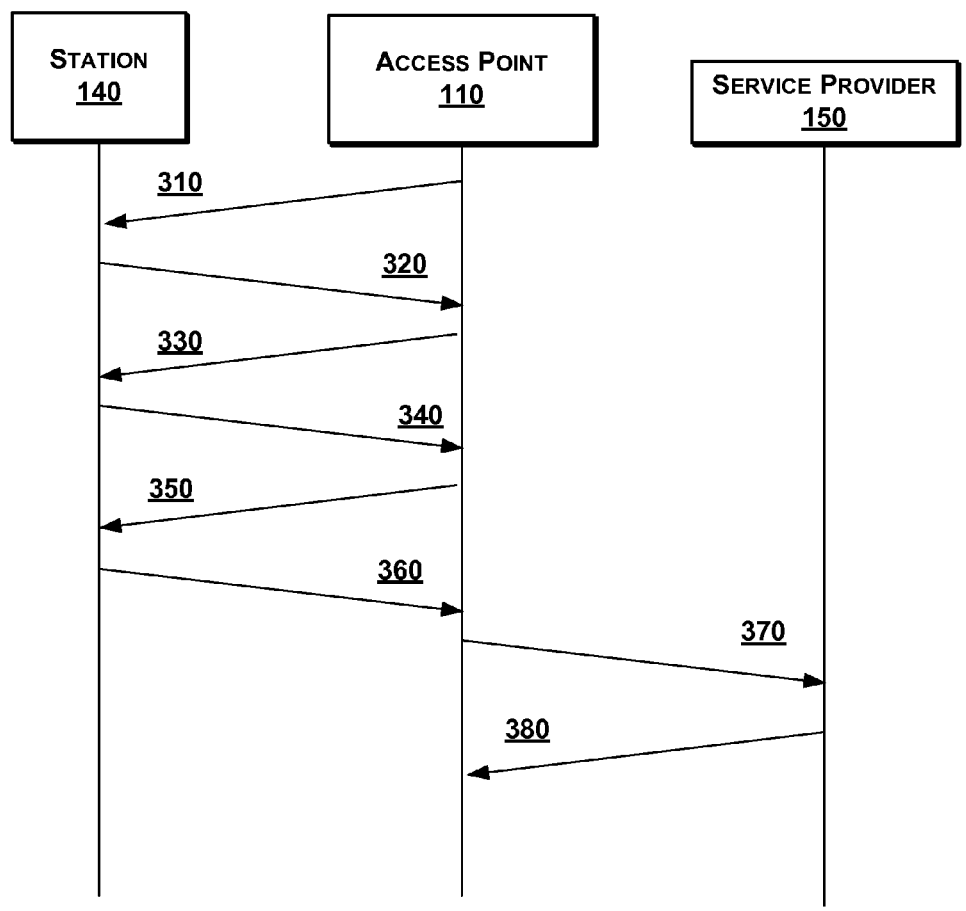
FIG. 3 is a sequence diagram illustrating interactions between components of the system of FIG. 1, according to one embodiment.

FIG. 3 is a sequence diagram illustrating interactions 300 between components of the system 100 of FIG. 1, according to one embodiment. The illustrated interactions 300 are not intended to be limiting. As such, the interactions 310 to 380 can be a portion of steps from a longer process, separate interactions can be combined (e.g., interactions 320 and 340), and can occur in different orders.

Initially, the access point 110 broadcasts beacons to all stations including the station 150 that includes a BSSID and an initial list of three realms (interaction 310). In response, the station 150 uses the BSSID as an address to send a GAS query to the access point 110 (interaction 320). Then the access point 110 sends a GAS query response containing a query protocol ID to the station 150 (interaction 330). Given this information, the station 150 sends an ANQP query for a NAI realm list to the access point 110 (interaction 340).

Techniques herein are applied in order to dynamically generate a list of realms customized for the requestor. The access point 110 sends the dynamically generated list to that station 140 in an ANQP response (interaction 350). A selected realm along with authentication information is finally sent from that station 110 to the access point 110 (interaction 360) which in turn presents the information to the service provider 150 (interaction 370) and receives a success or failure message concerning the authentication information (interaction 380).

FIG. 4A shows an Interworking element 400 included in beacons and probe responses. Inclusion of the Interworking element 400 indicates IEEE 802.11u compatibility. Within the Internetworking element 400, a network type element can indicate a network type as private, private with guest access, chargeable or free. An Internet field can be set to 1 if Wi-Fi network provides internet access. An ASRA (additional authentication step required) field and Emergency Service Accessible field can also be included. In response, a station can request a list of reams from an access point.

FIG. 4B shows a Roaming Consortium element 410 included beacons and probe responses. The Roaming Consortium element 420 indicates to stations which realms are available to an access point at a host spot. In return, stations can quickly scan to determine if there are any Wi-Fi networks for which it has valid security credentials. A number of ANQP OIs provides number of additional OIs (or OUIs) which are available upon request to an access point, and can be provided upon request by stations to an access point. The OI fields provide the three default realms. Stations unsatisfied with the default OIs can request additional realms from an access point.

FIG. 4C shows an Advertisement Protocol element 420 included in beacons and probe responses. By scanning Advertisement Protocol Tuple fields of the Advertisement Protocol element 420, a station can determine the protocol necessary to query an access point for additional information. In particular, support for ANQP protocol is one mechanism for a list of dynamically generated realms to be sent.

In some embodiments, the elements 400, 410, 420 are transmitted together within a single frame, and in other embodiments, are transmitted over more than one frame. One of ordinary skill in the art will recognize that alternative protocols formats, later versions of IEEE 802.11u formats, and proprietary frame formats, are all contemplated within the scope of the present disclosure.

Figure 5:
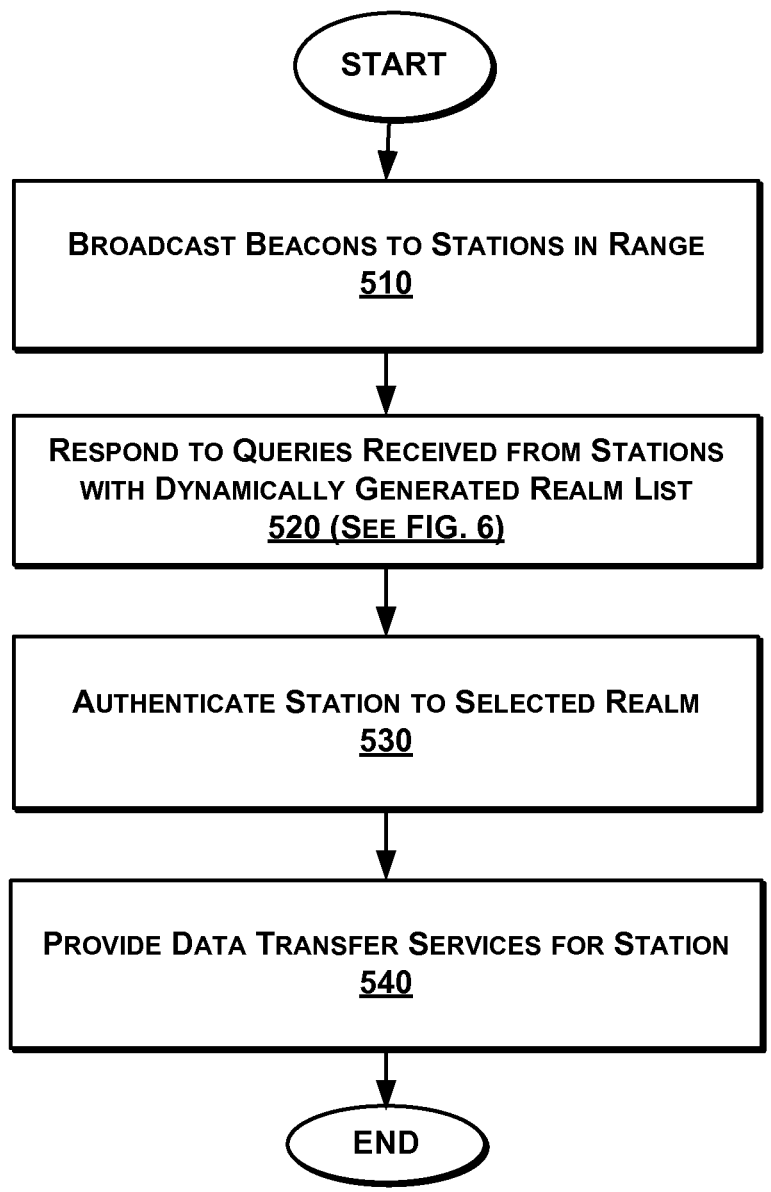
FIG. 5 is a flow diagram illustrating a method for connected roaming stations to hot spots, according to one embodiment.
Figure 6:
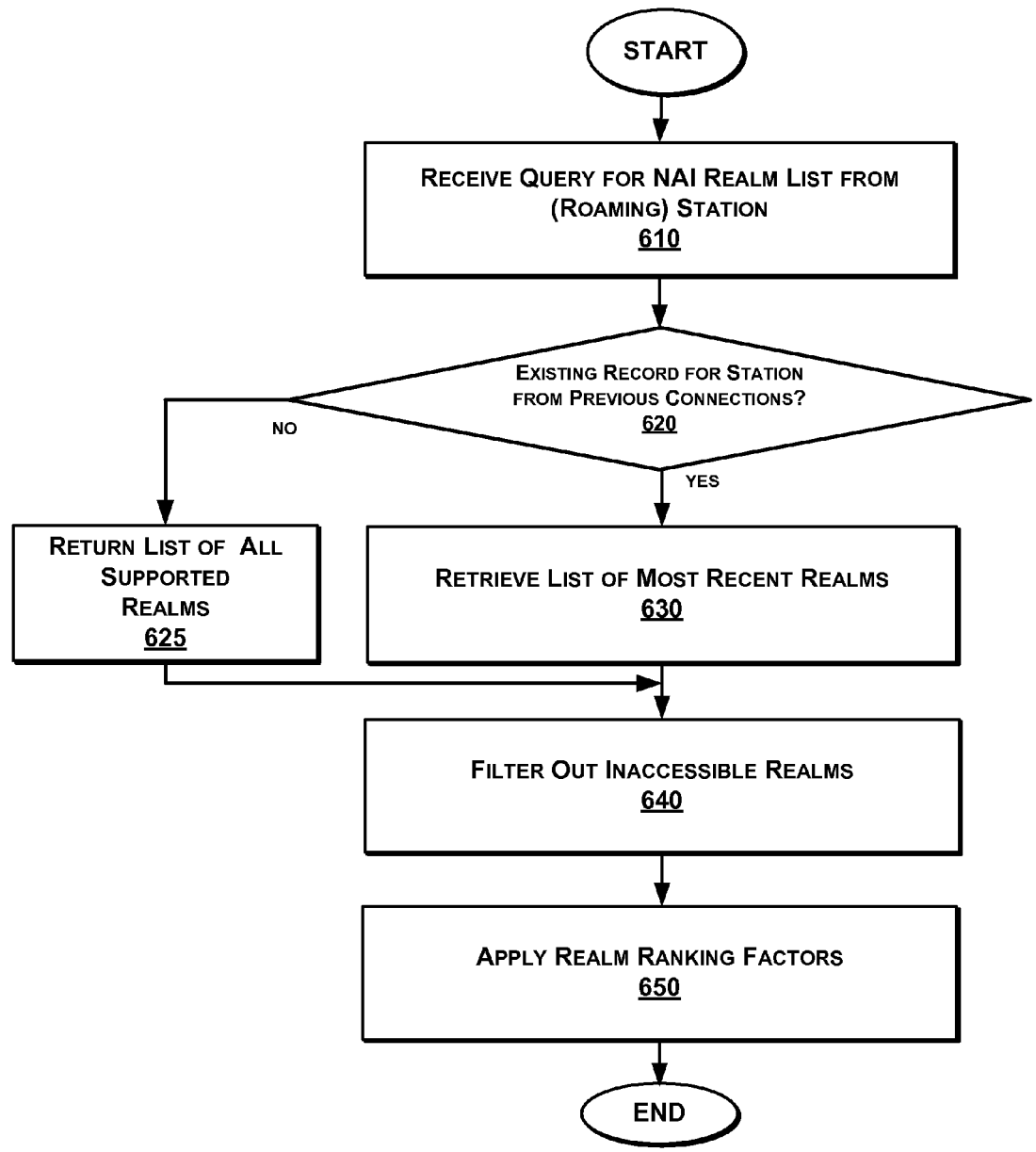
FIG. 6 is a flow diagram illustrating an example of a step for dynamically generating per-station realms lists for host spot connections in more detail, according to one embodiment.

Methods for Dynamically Generating Per-Station Realm Lists for Hot Spot Connections (FIG. 5-6)

FIG. 5 is a flow diagram illustrating a method 500 for connected roaming stations to hot spots, according to one embodiment. The method 500 can be implemented, for example, in the access point 100 of FIG. 1.

Beacons are broadcast to stations within range (step 510). Queries for realm lists received from stations are responded to with dynamically generated real lists (step 520). Once a real selection is received, the station is authenticated with that realm (step 530). Data transfer services are then available for stations (step 540).

FIG. 6 is a flow diagram illustrating an example of the step 520 for dynamically generating per-station realms lists for host spot connections in more detail, according to one embodiment.

A query for an NAI realm list is received from a station (step 610). If a record exists for a station requesting the realms, a list of most recent realms is retrieved (e.g., last N realms) (step 630), but if no record exists, a list of all supported realms is returned (step 625) and the process is not necessarily customized per-station in this instance. However, other profiling characteristics can be used for realm selection, such as device type or bandwidth needs. Various narrowing algorithms can be applied. In the present embodiment, inaccessible realms are filtered out of the list (step 640). Additional realm ranking factors can also be applied, such as preferring realms due to financial consideration or popularity (step 650).

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the access point 110 and the stations 150A-N. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage device 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of SDN controllers or access points as illustrated in FIGS. 2 and 3. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage device 730

The storage device 730 can be any non-volatile type of storage such as a magnetic disc, EEPROM, Flash, or the like. The storage device 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method for generating a list of per-station NAI (Network Access Identifier) realms for a hot spot WLAN connection, the method comprising the steps of:
    receiving a query for a list of realms from a station during a connection to a hot spot;
    responsive to detecting the request specifically from the station, retrieving a history of previous connections by the station, generating the list of realms that are a subset of a list of realms available to the hot spot, and including at least one realm from the history of previous connections in the list of realms;
    receiving a selection from the list of realms;
    authenticating the station with the selected realm; and
    forwarding data traffic concerning the station through the hot spot on behalf of the selected realm.

2. The method of claim 1, wherein generating the list of realms that are a subset of the list of available realms further comprises:
    receiving a list of realms subject to roaming agreements between the hot spot and the realm; and
    including at least one or more realms in the list of available realms based on the list of realms subject to the roaming agreements in the list of realms.

3. The method of claim 1, wherein generating the list of realms that are a subset of the list of available realms further comprises:
    receiving link quality information concerning the list of available realms; and determining whether to include at least one realm from the list of available realms based on the link quality information.

4. The method of claim 1, further comprising:
configuring the list of available realms that are compatible with the hot spot.

5. The method of claim 1, further comprising:
implementing a tunnel between the hot spot and the selected realm to forward the data concerning the station.

6. The method of claim 1, further comprising:
determining one or more realms to which the station has a subscription; and
including at least one of one or more realms which the station has a subscription within the list of realms.

7. The method of claim 1, further comprising:
responsive to detecting a request specifically from a second station, generating a second list of realms that are a second subset of the list of available realms, wherein the first list of realms for the station differs from the first list of realms for the second station.

8. The method of claim 1, wherein detecting the request comprises:
detecting the request responsive to the computing device automatically offloading data from a cellular network to the hot spot,
wherein the list of realms includes at least one realm associated with the cellular network.

9. A non-transitory computer-readable medium storing source code that, when executed by a processor, generates a list of per-station NAI (Network Access Identifier) realms for a hot spot WLAN connection, comprising:
receiving a query for a list of realms from a station during a connection to a hot spot;
responsive to detecting the request specifically from the station, responsive to detecting the request specifically from the station, retrieving a history of previous connections by the station, generating the list of realms that are a subset of a list of realms available to the hot spot, and including at least one realm from the history of previous connections in the list of realms;
receiving a selection from the list of realms;
authenticating the station with the selected realm; and
forwarding data traffic concerning the station through the hot spot on behalf of the selected realm.

10. The computer-readable medium of claim 9, wherein the generating the list of realms that are a subset of the list of available realms further comprises:
retrieving a history of previous connections by the station; and
including at least one realm from the history of previous connections in the list of realms.

11. The computer-readable medium of claim 9, wherein the generating the list of realms that are a subset of the list of available realms further comprises:
receiving a list of realms subject to roaming agreements between the hot spot and the realm; and
including at least one or more realms in the list of available realms based on the list of realms subject to the roaming agreements in the list of realms.

12. The computer-readable medium of claim 9, wherein the generating the list of realms that are a subset of the list of available realms further comprises:
receiving link quality information concerning the list of available realms; and
determining whether to include at least one realm from the list of available realms based on the link quality information.

13. The computer-readable medium of claim 9, further comprising:
configuring the list of available realms that are compatible with the hot spot.

14. The computer-readable medium of claim 9, wherein the method further comprises:
implementing a tunnel between the hot spot and the selected realm to forward the data concerning the station.

15. The computer-readable medium of claim 9, further comprising:
determining one or more realms to which the station has a subscription; and
including at least one of one or more realms which the station has a subscription within the list of realms.

16. The computer-readable medium of claim 9, further comprising:
responsive to detecting a request specifically from a second station, generating a second list of realms that are a second subset of the list of available realms, wherein the first list of realms for the station differs from the first list of realms for the second station.

17. The computer-readable medium of claim 9, wherein the detecting the request comprises:
detecting the request responsive to the computing device automatically offloading data from a cellular network to the hot spot,
wherein the list of realms includes at least one realm associated with the cellular network.

18. An access point to generate a list of per-station NAI (Network Access Identifier) realms for a hot spot WLAN connection, the access point comprising:
a processor;
a network interface device; and
a memory, storing:
a first module, executable by the processor, to receive a query for a list of realms from a station during a connection to a hot spot;
a second module, executable by the processor, to, responsive to detecting the request specifically from the station, retrieve a history of previous connections by the station, generate the list of realms that are a subset of a list of realms available to the hot spot, and include at least one realm from the history of previous connections in the list of realms;
a third module, executable by the processor, to receive a selection from the list of realms;
a fourth module, executable by the processor, to authenticate the station with the selected realm; and
a fifth module, executable by the processor, to forward data traffic concerning the station through the hot spot on behalf of the selected realm.

* * * * *